United States Patent
Clausen et al.

(10) Patent No.: US 6,289,879 B1
(45) Date of Patent: Sep. 18, 2001

(54) AIR ELIMINATING RETURN FUEL RECIRCULATION VALVE

(75) Inventors: Michael D. Clausen, Turlock; Steven R. Knight, Modesto, both of CA (US)

(73) Assignee: Parker-Hannifin Corp., Cleveland, OH (US)

( * ) Notice: Subject to any disclaimer, the term of this patent is extended or adjusted under 35 U.S.C. 154(b) by 0 days.

(21) Appl. No.: 09/477,489

(22) Filed: Jan. 4, 2000

Related U.S. Application Data

(60) Provisional application No. 60/167,474, filed on Nov. 24, 1999.

(51) Int. Cl.[7] .................................................. F02M 37/04
(52) U.S. Cl. ............................ 123/516; 123/514; 123/557
(58) Field of Search ..................................... 123/514, 516, 123/557, 510, 509, 456

(56) References Cited

U.S. PATENT DOCUMENTS

| | | | |
|---|---|---|---|
| 2,222,274 | * 11/1940 | Antonsen | 123/516 |
| 2,599,699 | * 6/1952 | Dilworth | 123/516 |
| 2,729,339 | 1/1956 | McCoy . | |
| 2,942,572 | 6/1960 | Pall . | |
| 3,754,538 | 8/1973 | Ephraim, Jr. et al. . | |
| 3,836,074 | 9/1974 | Meulendyk . | |
| 4,172,971 | 10/1979 | Silverwater et al. . | |
| 4,379,053 | 4/1983 | Brane . | |
| 4,452,213 | * 6/1984 | Duprez | 123/516 |
| 4,502,450 | 3/1985 | Duprez . | |
| 4,502,451 | 3/1985 | Duprez . | |
| 4,503,885 | * 3/1985 | Hall | 137/574 |
| 4,543,938 | * 10/1985 | Szlaga | 123/514 |
| 4,554,848 | * 11/1985 | Galletto | 81/447 |
| 4,607,604 | 8/1986 | Kanoh et al. . | |
| 4,617,116 | * 10/1986 | Seiler | 210/137 |
| 4,625,701 | * 12/1986 | Bartlett et al. | 123/514 |
| 4,844,032 | 7/1989 | Groeger et al. . | |
| 4,886,019 | 12/1989 | Davis et al. . | |
| 4,893,603 | * 1/1990 | Siebels | 123/514 |
| 5,318,268 | 6/1994 | Cox et al. . | |
| 5,832,902 | * 11/1998 | Davis et al. | 123/514 |
| 5,896,846 | * 4/1999 | Bauer et al. | 123/510 |

FOREIGN PATENT DOCUMENTS

| | | |
|---|---|---|
| 0 819 458 A1 | 1/1998 | (EP) . |
| 0 887 542 A1 | 12/1998 | (EP) . |

\* cited by examiner

*Primary Examiner*—Carl S. Miller
(74) *Attorney, Agent, or Firm*—Christopher H. Hunter

(57) ABSTRACT

A recirculating valve for the fuel system of an internal combustion engine includes a valve body with a fuel supply passage and a fuel return passage. An air separation chamber and a restricted orifice are provided in the fuel return passage. A pressure valve allows excess heated return fuel in the air separation chamber to recirculate with the fuel in the fuel supply passage. The valve also directs return air back to the tank and prevents the air from passing to the engine. A thermal actuator maintains the pressure valve in a closed condition when the fuel increases above a predetermined temperature. A relief valve can be provided in the fuel return outlet port to allow fuel to easily pass back to tank during normal operating conditions.

24 Claims, 5 Drawing Sheets

AIR ELIMINATING RETURN FUEL RECIRCULATION VALVE

RELATED CASES

The present application claims priority to U.S. Provisional Application Ser. No. 60/167,474; filed Nov. 24, 1999.

FIELD OF THE INVENTION

The present invention relates generally to fuel systems for internal combustion engines.

BACKGROUND OF THE INVENTION

Most fuel systems for internal combustion engines include a tank for holding a supply of fuel, an engine where the fuel is converted into energy, and a filter between the tank and the engine to separate particles and contaminants that could cause adverse effects to the engine. In certain engines, for example diesel engines, the fuel can wax or plug the filter during cold operation. This is a well-known problem, and many devices have been developed in an attempt to solve this. For example, a heater can be provided internally of the filter housing to heat the fuel and the media as the fuel passes through the filter (see, e.g., Richard, U.S. Pat. No. 4,091,265).

Another technique which can be used alternatively or in addition to a filter heater, is to use excess fuel from the engine. Excess fuel that is not burned in the engine is normally recirculated back to the tank. Since the fuel is warmed when it passes through the engine, the fuel can be directed back through the filter to warm the filter. It is believed that prior techniques have included a simple valve that opens under cold temperature operating conditions, and redirects at least a portion of the excess heated fuel back into the filter element. The valve then closes after the engine is warm to direct all the excess fuel back to the tank. While this technique provides some relief from the problem of waxing and plugging of the filter, it is believed that the prior techniques have also recirculated any excess air received back from the engine. The engine supplies air particularly during its priming, and the air is simply fed back with the fuel through the filter to the engine. Recirculating the air with the fuel, however, can effect the combustion characteristics of the engine, which is undesirable from an efficiency standpoint.

As such, applicants believe there is a demand in the industry for a fuel system which recirculates excess warm fuel from the engine so as to at least reduce waxing and plugging problems in the filter during cold start, but which can also differentiate between fuel and air, such that only the warm fuel is directed back to the filter during cold star-up, and any air is directed back to the tank.

SUMMARY OF THE PRESENT INVENTION

The present invention provides a novel and unique valve for a fuel system which directs excess heated fuel back through the filter during cold operation, and which directs any air from the engine directly back to the tank.

According to the present invention, the recirculation valve has a body including a fuel supply passage which receives fuel from the tank and directs the fuel to the filter and then on to the engine; and a fuel return passage which receives excess fuel and air from the engine. The fuel return passage includes an enlarged air separation chamber, and a fixed orifice at the downstream end of the air separation chamber to a fuel return outlet port. The orifice has a restricted diameter that allows air to pass to the outlet port, and then back to the tank, but which causes a pressure drop when fuel enters the chamber.

A pressure valve is located in a valve passage interconnecting the air separation chamber and the fuel supply passage. The pressure valve includes a spring biased valve head with a valve seal. The pressure valve is normally in a closed condition when only air is present in the air separation chamber. When fuel enters the air separation chamber, the pressure in the chamber increases, and moves the pressure valve into an open condition. When the valve is in an open condition, the excess fuel in the chamber flows into the fuel supply passage, and then back the filter, where the warm fuel warms the filter to prevent waxing and plugging. The orifice in the air separation chamber is located toward the upper portion of the chamber such that the air continues to pass directly to the tank, while the fuel, in the bottom portion of the chamber, is directed through the pressure valve and recirculates back to the engine.

A thermal actuator can also be provided with the pressure valve to maintain the pressure valve in the closed condition when the fuel through the fuel supply passage is above a predetermined temperature, such as after engine warm-up. In this case, all excess fuel and air is directed through the orifice back to the tank.

A relief valve can alternatively be provided in the fuel return outlet port instead of the fixed orifice. The relief valve includes a valve head with a restrictive orifice, where the valve head is spring-biased against an opening into the air separation chamber. The orifice in the relief valve functions in the same manner as the fixed orifice to direct air in the chamber back to the tank, and to cause a pressure drop when fuel is present in the chamber. After the engine warms up and the thermal actuator closes the pressure valve, the relief valve opens to allow excess fuel to easily pass back to the tank with minimal pressure drop.

As such, as described above, the present invention provides a novel and unique recirculating valve which effectively differentiates between air and fuel, and allows excess heated fuel to recirculate through the fuel system during cold operation to prevent plugging and waxing of the filter, and which directs any air from the engine directly back to the tank. The recirculation valve is simple in construction, and operates effectively to reduce, if not eliminate, any air recirculated back to the engine.

Further features of the present invention will become apparent to those skilled in the art upon reviewing the following specification and attached drawings.

DETAILED DESCRIPTION OF THE PREFERRED EMBODIMENT

Figure 1:
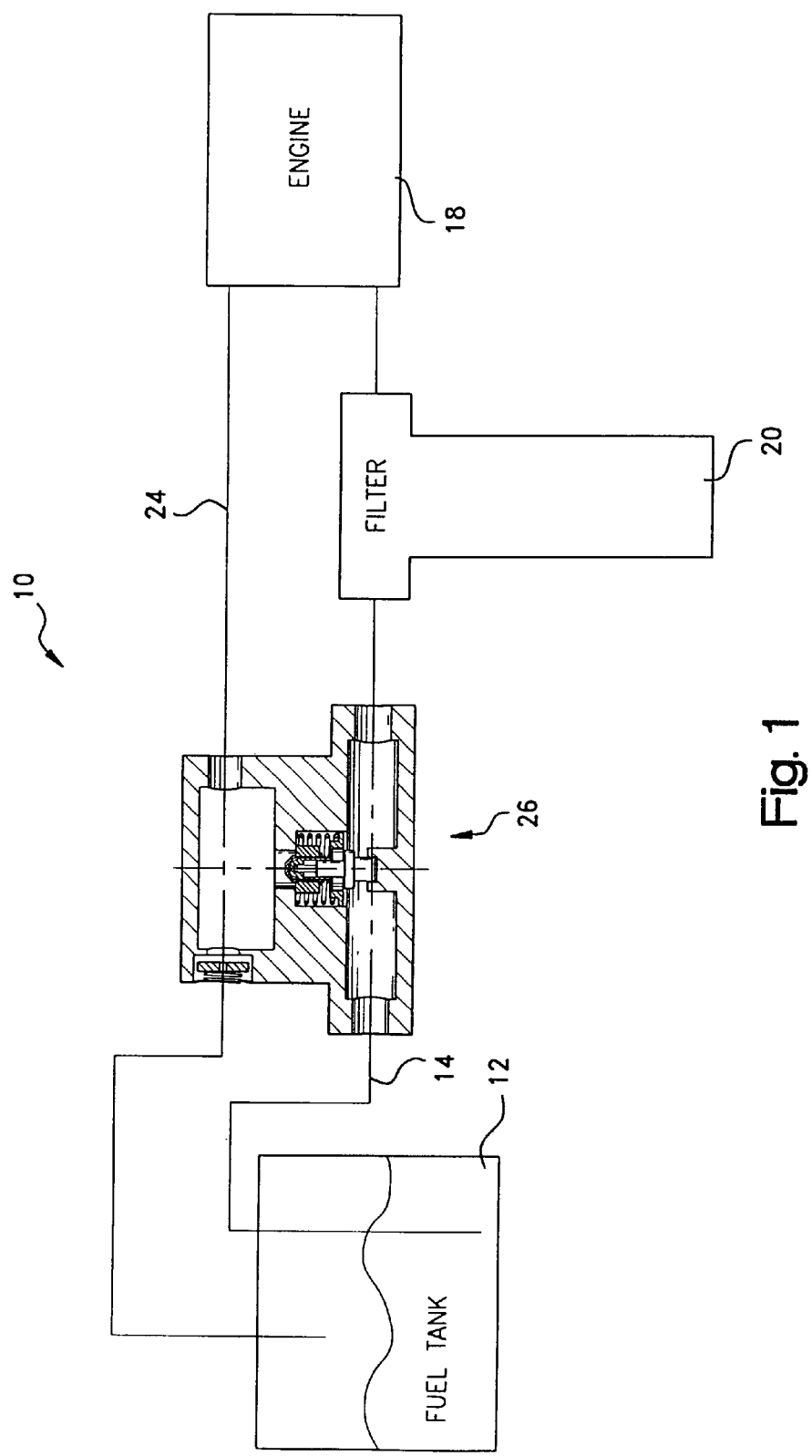
FIG. 1 is schematic illustration of a fuel system for an internal combustion engine with a recirculation valve constructed according to the principles of the present invention.

Referring to the drawings and initially to FIG. 1, a fuel system for an internal combustion engine is indicated generally at 10. The fuel system includes a fuel tank 12 providing fuel through a fuel supply line 14 to an engine 18. The engine 18 is preferably an internal combustion engine for a vehicle, however, the present invention is applicable to internal combustion engines for any application. A fuel filter 20 is located between the tank and engine to separate particles and other contaminants in the fuel. The fuel filter can be any filter appropriate for the particular application, such as the filter shown in U.S. Pat. No. 4,091,265. A return line 14 recirculates excess fuel that is not burned in the engine back to tank 12. A fuel recirculation valve, indicated generally at 26, is interposed between return line 24 and supply line 14 to recirculate at least a portion of the hot excess fuel at predetermined temperatures back into supply line 14, where the hot excess fuel can warm the fuel filter 20 to prevent or at least reduce plugging and waxing during cold temperature conditions as at start-up.

Figure 2:
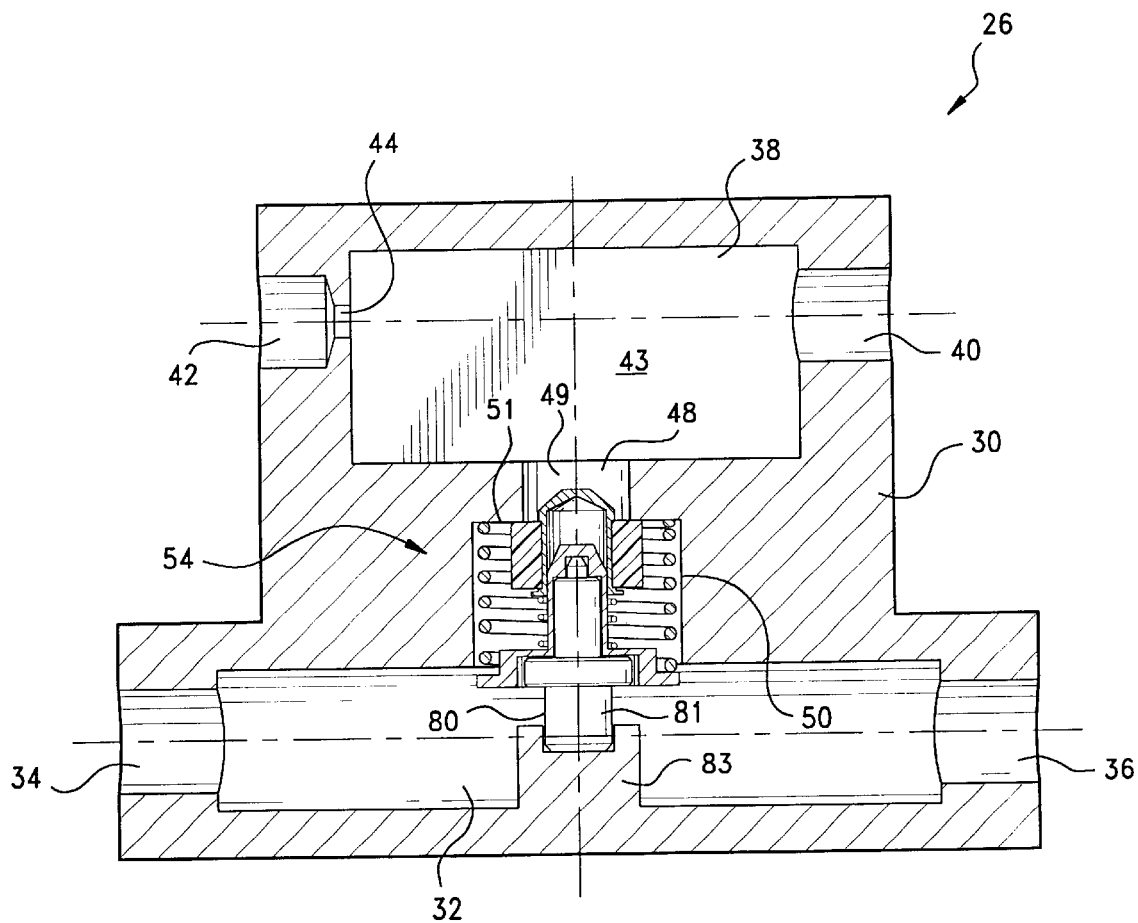
FIG. 2 is a cross-sectional side view of a recirculation valve constructed according to the principles of the present invention, with the recirculation valve illustrated in a closed condition.

Referring now to FIG. 2, the recirculating valve 26 includes a one-piece valve body 30 having a fuel supply passage 32. The fuel supply passage 32 has a fuel supply inlet port 34 receiving fuel from the fuel tank and a fuel supply outlet port 36 directing fuel to the engine. Body 30 further includes a fuel return passage 38 with a fuel return inlet port 40 receiving excess fuel from engine 18, and a fuel return outlet port 42 fluidly connected to fuel tank 12. Fuel return passage 38 includes an enlarged air separation chamber, indicated at 43, with ports 40 and 42 connected toward the upper portion of the chamber. A restricted orifice 44 is provided between the chamber 43 and the fuel return outlet port 42.

Figure 3:
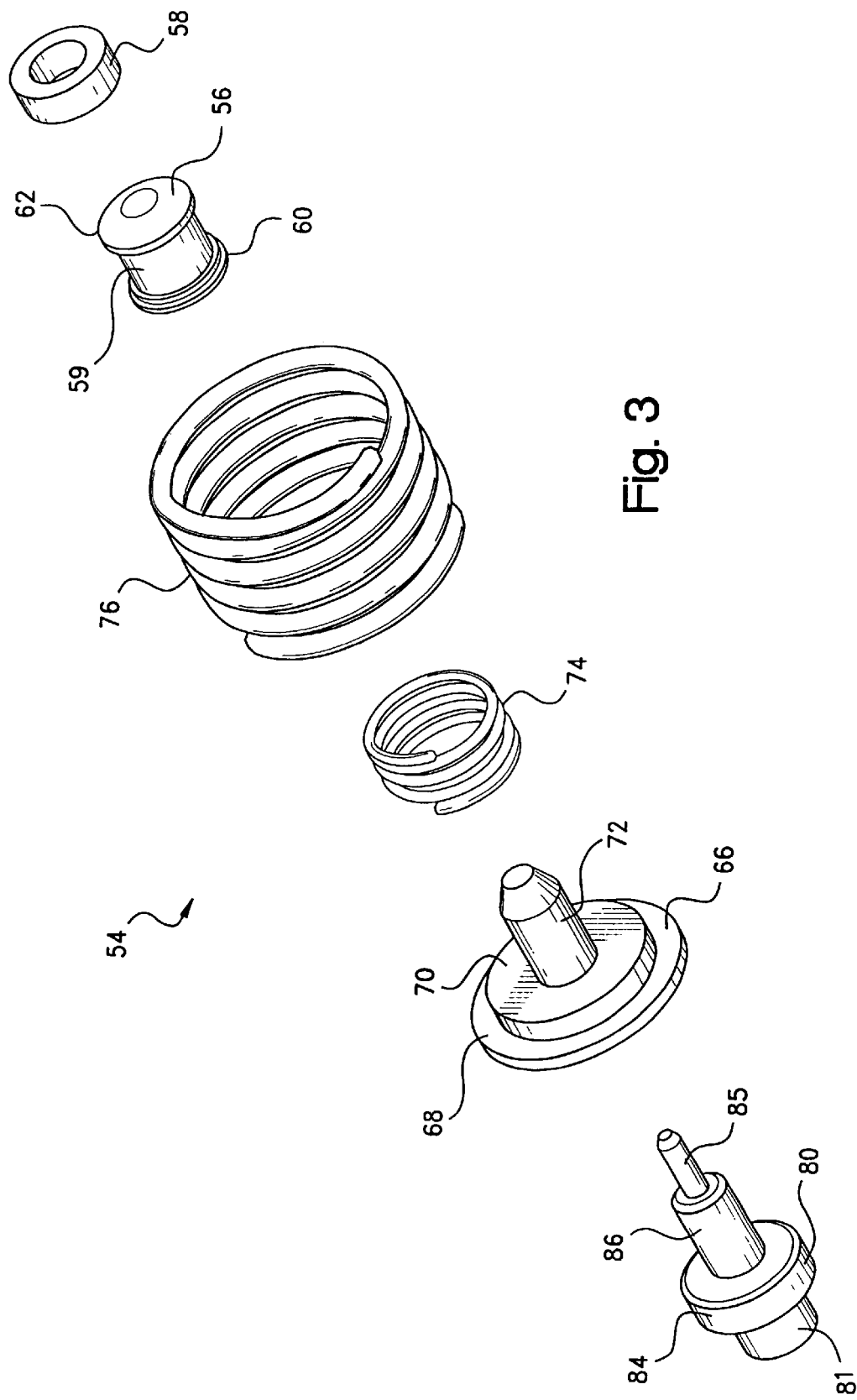
FIG. 3 is an exploded view of a pressure valve for the recirculation valve.

A valve passage 48 interconnects chamber 43 and fuel supply passage 32. Valve passage 48 includes a reduced diameter portion 49 opening into the lower portion of chamber 43, and a enlarged diameter portion 50 opening into fuel supply passage 32. An annular shoulder 51 is defined between reduced portion 49 and enlarged portion 50. The recirculation valve 26 includes a pressure valve, indicated generally at 54. The pressure valve 54 controls the recirculation of excess heated fuel received through fuel return inlet port 40 to the fuel supply passage 32. Referring now also to FIG. 3, the pressure valve 54 includes a hollow valve head 56 having an annular elastomeric gasket 58 mounted thereon. Gasket 58 is closely received on a cylindrical body portion 59 of the valve head and retained between a lower annular flange 60 and an upper annular flange 62 at opposite ends of head.

The pressure valve 54 further includes a hollow thermal valve body 66 having an outer annular lower spring stop portion 68 and an inner annular lower spring stop portion 70. Body 66 further includes a central cylindrical post 72 projecting axially upward from inner annular lower spring stop portion 70.

The valve head 56 and thermal valve body 66 are each preferably formed in one piece from an appropriate material, such as plastic.

A pressure regulator spring 74 is received about the central post 72 of body 66, and extends between the lower spring stop 70 and the lower annular flange 60 of valve head 56 (see FIG. 2). A thermal actuator return spring 76 is also received about central post 72 and extends between outer spring stop 68 and shoulder 51 in valve passage 49 (see FIG. 2).

The pressure valve further includes a thermal actuator 80 that is received within the hollow thermal valve body 66. Thermal actuator 80 includes a cylindrical base 81 which is fixed to a cylindrical flange 83 (FIG. 2) projecting from valve body 30 into fuel supply passage 32. An annular flange 84 surrounds base 81 and allows the actuator to be properly located in a small cylindrical chamber of thermal valve body 66. The thermal actuator 80 further includes a central post 85 which is normally retracted within a cylindrical body 86 in the actuator when the ambient temperature exposed to base 81 is below a predetermined level, but which extends outwardly from body 86 when the ambient temperature exposed to base 81 increases above such predetermined level. The operation of the thermal actuator 80 should be well-known to those skilled in the art. Thermal actuator 80 is preferably a commercially-available actuator from Caltherm, under Part No. CT 5032-02M. Thermal actuators of this type are commonly used in automotive coolant thermostats. It is noted that other types of thermal actuators could also be used with the present invention, one such alternative being a bi-metal, dome-shaped disk which would "flip" from one condition to another depending upon the temperature to which it is exposed. Other such appropriate actuators should also be well-known to those skilled in the art.

As can be seen in FIG. 2, when the pressure valve 54 is assembled, the thermal actuator 80 fits closely within thermal valve body 66, and the cylindrical post 72 of the thermal valve body 66 is received closely within the hollow cylindrical body 59 of the valve head 66.

With the thermal actuator 80 fixed to flange 83, thermal actuator return spring 76 biases thermal valve body 66 downwardly, away from shoulder 51, such that the body 66 is maintained in an even, non-cocked position. The pressure regulator spring 74 biases valve head 56 upwardly, toward shoulder 51, such that gasket 58 is sealed against the shoulder. Shoulder 51 thereby also provides a valve seat for the pressure valve 54.

FIG. 2 illustrates the cold start or cold operating condition of the engine, where the ambient temperature and fuel are at relatively low temperatures. Fuel is drawn from the fuel tank, and directed through fuel supply passage 32 to the filter, and then on to the engine. The base 81 of the thermal actuator 80 is exposed to the fuel, and the thermal actuator is maintained in a non-operative, or retracted condition. As the engine operates, excess air (typically at pressures of less than 2 psi) is received through fuel return inlet port 40 and passes into air separation chamber 43. The pressure valve 54 is set through the spring constant of pressure regulator spring 74, such that the pressure regulator valve remains closed. The air passes through the restricted orifice 54 and through fuel return outlet port 40 directly back to the fuel tank. As such, the pressure valve 54 prevents the air from being recirculated to the engine, and thereby maintains the efficiency of the engine.

Figure 4:
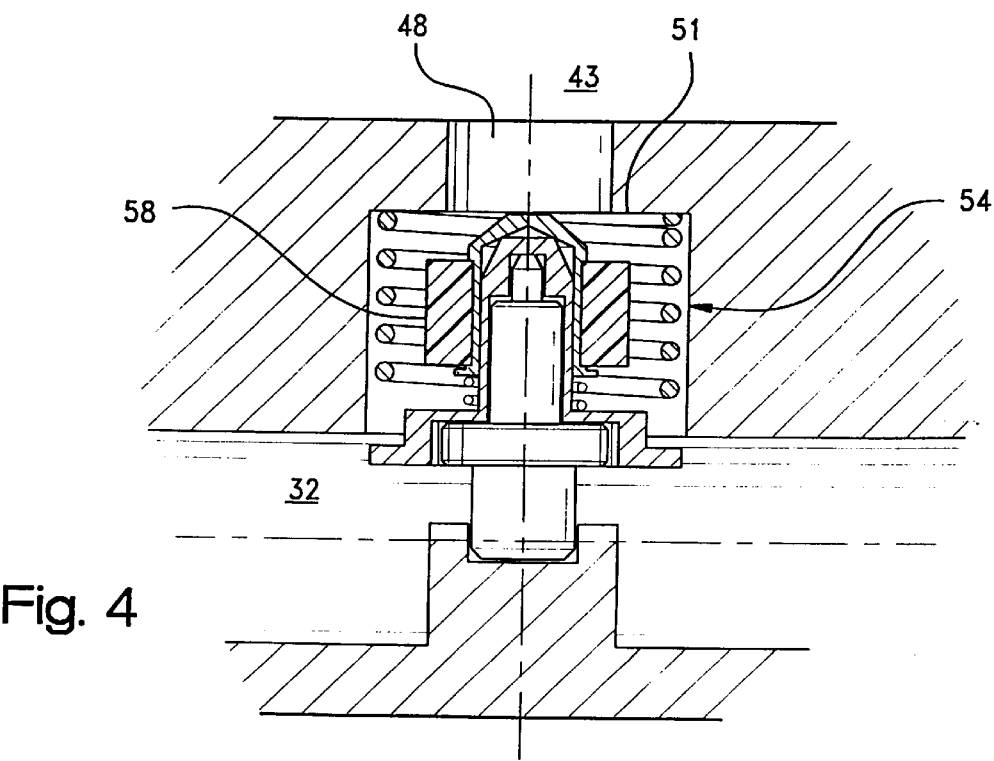
FIG. 4 is an enlarged, cross-sectional side view of a portion of the recirculation valve, showing the recirculation valve in an open condition.

As excess heated fuel is also supplied from the engine to the fuel return inlet port 40, the fuel also enters the air separation chamber 43. The increased pressure of the fuel (which is typically at pressures of over 2 psi) causes pressure valve 54 to move to an open condition, as illustrated in FIG. 4. In such open condition, seal 58 moves away from shoulder 51 to allow fuel in chamber 43 to flow through valve passage 48 to fuel supply passage 32. As can be seen in FIG.

4, valve head 56 compresses pressure regulator spring 74 and moves downwardly around cylindrical post 72 of thermal valve body 66. In the open condition of FIG. 4, the excess heated fuel flows back through the fuel supply passage 32 and enters filter 20, where the heated fuel prevents, or at least reduces, waxing and plugging of the filter. Since the fuel is generally at the bottom of the chamber 43, while the air remains at the top, the air is prevented from entering the valve passage 48 and passing back to the engine.

Figure 5:
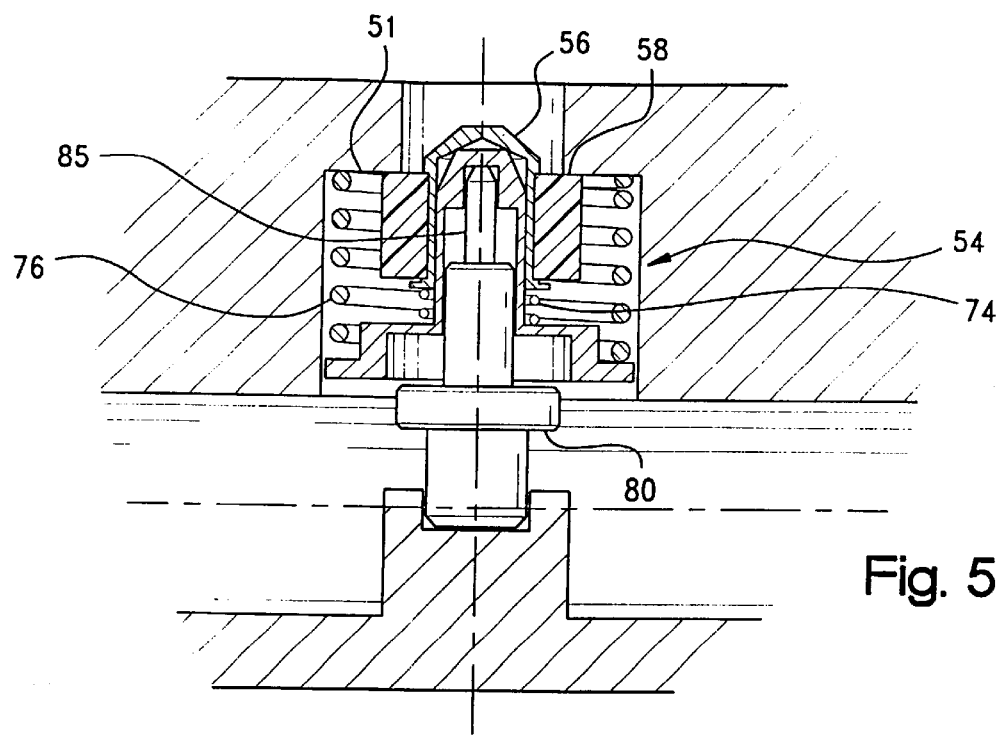
FIG. 5 is a cross-sectional side view of the recirculation valve similar to FIG. 2, but showing a thermal actuator for the valve in an operative condition.

As the fuel temperature rises, the thermal actuator valve 80 becomes operational, with post 85 extending outwardly from body 86, as illustrated in FIG. 5. Post 85 forces cylindrical post 72, and hence thermal valve body 66, upwardly within valve passage 49. This action compresses thermal actuator return spring 76, and causes additional upward force on valve head 56 through pressure regulator spring 74 to cause seal 58 to seal against shoulder 51 of valve passage 49. When the engine is warm, the air and excess fuel are thereby both directed back to the tank through orifice 44.

Air separation chamber 43 is sized so as to collect excess fuel and allow the fuel to recirculate through pressure valve 44, and to allow any returning air to pass through restricted orifice 44 and return directly to the fuel tank. The size of the air separation chamber, the size of the restricted orifice 44, and the spring force on pressure regulator spring 74, can be easily determined depending upon the particular application.

As such, as described above, a device is provided for controlling the recirculation of fuel in the fuel system of an internal combustion engine. The device effectively separates air from the excess fuel, such that the excess fuel can be used to heat the filter and prevent waxing and plugging during cold-start operation, while any air is directed back to the fuel tank such that it will not reduce the efficiency of the engine.

Figure 6:
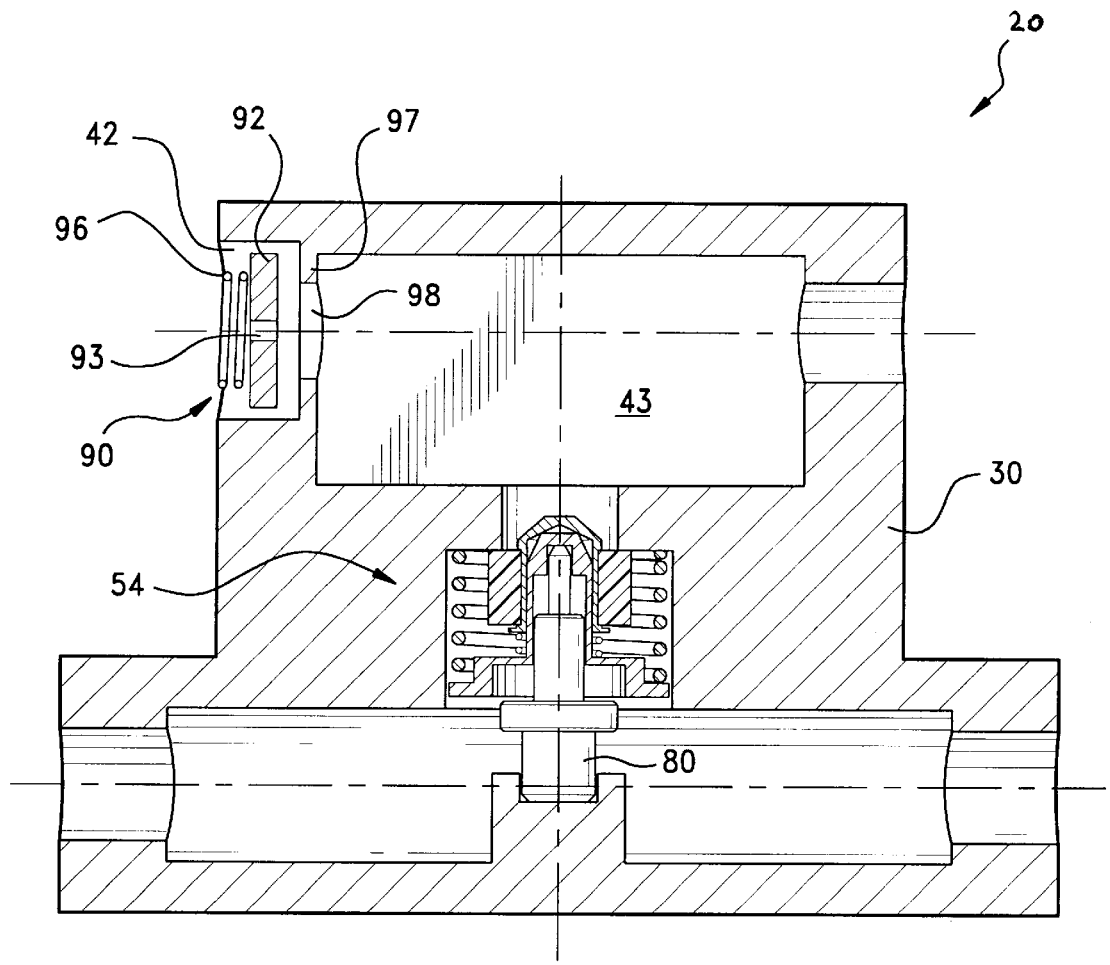
FIG. 6 is a cross-sectional side view of a further embodiment of the recirculation valve.

As shown in FIG. 6, a relief valve, indicated generally at 90, can alternatively be provided to accomplish the same result as the fixed orifice 44, as well as to reduce the pressure drop of excess fuel returning to the tank during warm operation. In this case, the relief valve 90 includes an annular elastomeric seal 92 with a central restricted orifice 93. A relief spring 96 normally urges seal 92 against an annular flange 97 surrounding an opening 98 into chamber 43. Relief spring 96 preferably has a spring force slightly greater than pressure regulator spring 74, such that the relief valve remains closed when the pressure valve is operational. During cold temperature starts when air is present in air separation chamber 43, the spring 96 keeps seal 92 against the opening 98 and air passes through restricted orifice 93 in relief valve 90 in the same manner as described above with fixed orifice 44. When the fuel temperature increases and the thermal actuator 80 operates to force the pressure valve 54 into a closed condition, the pressure of fuel in air separation chamber 43 overcomes the force of release spring 96, and seal 92 moves away from opening 98, thereby allowing fuel to easily flow through return fuel outlet port 42 to the tank. The pressure drop of the fuel through the recirculation valve during normal (warmer) operating temperatures is thereby minimized.

The spring force of relief spring 96 can also easily be determined depending upon the particular application. The other operating characteristics of the pressure relief valve shown in FIG. 6 are the same as described previously with respect to FIGS. 2–5.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A recirculation valve for controlling the recirculation of fuel from a fuel tank to an engine where air is also supplied from the engine, the recirculation valve comprising:

a valve body having a fuel supply inlet port to receive fuel from the tank, a fuel supply outlet port to direct fuel to the engine, a fuel return inlet port to receive excess fuel and air from the engine, and a fuel return outlet port fluidly connected to the tank, a fuel supply passage interconnecting the fuel supply inlet port and the fuel supply outlet port, and a fuel return passage interconnecting the fuel return inlet port and the fuel return outlet port; and a pressure valve located between the fuel supply passage and the fuel return passage, the pressure valve normally in a closed condition when fuel is absent in the fuel return passage, and moving to an open condition in response to increasing fuel pressure in the fuel return passage to allow fuel in the fuel return passage to flow to the fuel supply passage, the pressure valve preventing air in the fuel return passage from communicating with fuel in the fuel supply passage, and further including a thermal actuator responsive to fuel temperature in the fuel supply passage, the thermal actuator maintaining the pressure valve in the closed condition when the fuel temperature in the fuel supply passage is above a predetermined level.

2. The recirculation valve as in claim 1, wherein the pressure valve is located in a valve passage interconnecting the fuel supply passage and the fuel return passage.

3. The recirculation valve as in claim 3, wherein said pressure valve includes a valve seal sealed against a valve seat in the valve passage when the pressure valve is in the closed condition, and moveable away from the valve seat when the pressure valve is in the open condition.

4. The recirculation valve as in claim 4, wherein said pressure valve is biased into the closed condition by a spring.

5. The recirculation valve as in claim 4, further including a thermal valve body receiving the thermal actuator, the thermal valve body having an annular lower spring stop, and the spring for the pressure valve extending between the valve seal and the lower spring stop of the thermal valve body, the thermal actuator moving the thermal valve body, and hence the lower spring stop, toward the valve seal when the fuel temperature is above the predetermined level so as to urge the pressure valve into the closed condition.

6. The recirculation valve as in claim 7, further including an additional spring extending between the valve seat in the valve passage and the lower spring stop of the thermal valve body, the additional spring urging the thermal valve body away from the valve seal.

7. The recirculation valve as in claim 9, wherein the valve head has a hollow cylindrical body, and the thermal valve body also includes a cylindrical body extending internally of the hollow cylindrical body of the valve head.

8. The recirculation valve as in claim 7, wherein an additional spring extends between the lower spring stop and the valve seat in the valve passage, the additional spring urging the thermal valve body away from the valve seal.

9. A recirculation valve for controlling the recirculation of fuel from a fuel tank to an engine where air is also supplied from the engine, the recirculation valve comprising:

a valve body having a fuel supply inlet port to receive fuel from the tank, a fuel supply outlet port to direct fuel to the engine, a fuel return inlet port to receive excess fuel and air from the engine, and a fuel return outlet port fluidly connected to the tank, a fuel supply passage interconnecting the fuel supply inlet port and the fuel supply outlet port, and a fuel return passage interconnecting the fuel return inlet port and the fuel return outlet port; and a pressure valve located between the fuel supply passage and the fuel return passage, the pressure valve normally in a closed condition when fuel is absent in the fuel return passage, and moving to an open condition in response to fuel pressure in the fuel return passage to allow fuel in the fuel return passage to flow to the fuel supply passage, the pressure valve preventing air in the fuel return passage from communicating with fuel in the fuel supply passage, wherein the pressure valve includes a cylindrical valve head, and the valve seat has an annular configuration closely surrounding the valve head, the valve head having a pair of outwardly-projecting flanges retaining the valve seal on the valve head, a lower of the flanges providing an upper spring stop for the spring.

10. A recirculation valve for controlling the recirculation of fuel from a fuel tank to an engine where air is also supplied from the engine, the recirculation valve comprising:

a valve body having a fuel supply inlet port to receive fuel from the tank, a fuel supply outlet port to direct fuel to the engine, a fuel return inlet port to receive excess fuel and air from the engine, and a fuel return outlet port fluidly connected to the tank, a fuel supply passage interconnecting the fuel supply inlet port and the fuel supply outlet port, and a fuel return passage interconnecting the fuel return inlet port and the fuel return outlet port; and a pressure valve located between the fuel supply passage and the fuel return passage, the pressure valve normally in a closed condition when fuel is absent in the fuel return passage, and moving to an open condition in response to fuel pressure in the fuel return passage to allow fuel in the fuel return passage to flow to the fuel supply passage, the pressure valve preventing air in the fuel return passage from communicating with fuel in the fuel supply passage, wherein the valve body further includes an air separation chamber in the fuel return passage, the air separation chamber having a dimension such that fuel collects in a lower portion of the chamber and air collects in an upper portion of the chamber, and wherein the valve body further includes a restrictive orifice between the air separation chamber and the fuel return outlet port, the restrictive orifice causing an increase in pressure in the chamber when fuel enters the air separation chamber.

11. The recirculation valve as in claim 10, wherein the pressure valve is located in a valve passage opening into the lower portion of the air separation chamber.

12. The recirculation valve as in claim 11, wherein the fuel return inlet port and fuel return outlet port open into the upper portion of the chamber.

13. A recirculation valve for controlling the recirculation of fuel from a fuel tank to an engine where air is also supplied from the engine, the recirculation valve comprising:

a valve body having a fuel supply inlet port to receive fuel from the tank, a fuel supply outlet port to direct fuel to the engine, a fuel return inlet port to receive excess fuel and air from the engine, and a fuel return outlet port fluidly connected to the tank, a fuel supply passage interconnecting the fuel supply inlet port and the fuel supply outlet port, a fuel return passage interconnecting the fuel return inlet port and the fuel return outlet port, and an air separation chamber in the fuel return passage, the air separation chamber having a dimension such that fuel collects in a lower portion of the chamber and air collects in an upper portion of the chamber; and a pressure valve located between the fuel supply passage and the fuel return passage, the pressure valve normally in a closed condition when fuel is absent in the fuel return passage, and moving to an open condition in response to fuel pressure in the fuel return passage to allow fuel in the fuel return passage to flow to the fuel supply passage, the pressure valve preventing air in the fuel return passage from communicating with fuel in the fuel supply passage, further including a relief valve in the fuel return outlet port, the relief valve causing an increase in pressure in the chamber when fuel enters the air separation chamber.

14. The recirculation valve as in claim 13, wherein the relief valve includes a valve seal and the restrictive orifice is provided in the valve seal.

15. The recirculation valve as in claim 10, wherein said pressure valve includes a valve seal sealed against a valve seat in the valve passage when the pressure valve is in the closed condition, and moveable away from the valve seat when the pressure valve is in the open condition.

16. The recirculation valve as in claim 15, wherein said pressure valve is biased into the closed condition by a spring.

17. The recirculation valve as in claim 16, further including a thermal actuator responsive to fuel temperature in the fuel supply passage, the thermal actuator maintaining the pressure valve in the closed condition passage when the fuel temperature in the fuel supply passage is above a predetermined level.

18. The recirculation valve as in claim 17, further including a thermal valve body receiving the thermal actuator, the thermal valve body having an annular lower spring stop, and the spring for the pressure valve extending between the valve seal and the lower spring stop of the thermal valve body, the thermal actuator moving the thermal valve body, and hence the lower spring stop, toward the valve seal when the fuel temperature is above the predetermined level so as to urge the pressure valve into the closed condition.

19. The recirculation valve as in claim 18, further including an additional spring extending between the valve seat in the valve passage and the lower spring stop of the thermal valve body, the additional spring urging the thermal valve body away from the valve seal.

20. The recirculation valve as in claim 18, wherein the valve head has a hollow cylindrical body, and the thermal valve body also includes a cylindrical body, the cylindrical body of the thermal valve body extending internally of the hollow cylindrical body of the valve head.

21. The recirculation valve as in claim 20, wherein an additional spring extends between the lower spring stop and the valve seat in the valve passage, the additional spring urging the thermal valve body away from the valve seal.

22. The recirculation valve as in claim 16, wherein the pressure valve includes a cylindrical valve head, and the valve seal has an annular configuration closely surrounding the valve head, the valve head having a pair of outwardly-projecting flanges retaining the valve seal on the valve head, a lower of the flanges providing an upper spring stop for the spring.

23. The recirculation valve as in claim 1, wherein the thermal actuator operatively engages the pressure relief valve.

24. A recirculation valve for controlling the recirculation of fuel from a fuel tank to an engine where air is also supplied from the engine, the recirculation valve comprising:

a valve body having a fuel supply passage with a fuel supply inlet port to receive fuel from the tank at one end of the passage, and a fuel supply outlet port to direct fuel to the engine at the other end of the passage, a fuel return inlet port to receive excess fuel and air from the engine, and a fuel return outlet port fluidly connected to the tank, and a fuel return passage interconnecting the fuel return inlet port and the fuel return outlet port; and a pressure valve located between the fuel supply passage and the fuel return passage, the pressure valve normally in a closed condition when fuel is absent in the fuel return passage, and moving to an open condition in response to increasing fuel pressure in the fuel return passage to allow fuel in the fuel return passage to flow to the fuel supply passage, the pressure valve preventing air in the fuel return passage from communicating with fuel in the fuel supply passage.

* * * * *